United States Patent Office 3,000,864
Patented Sept. 19, 1961

3,000,864
HYDROXYNORCAMPHANECARBOXYLIC ACIDS AND ESTERS, AND POLYESTERS THEREOF
John R. Caldwell and Winston J. Jackson, Jr., Kingsport, Tenn., assignors to Eastman Kodak Company, Rochester, N.Y., a corporation of New Jersey
No Drawing. Filed Apr. 4, 1958, Ser. No. 726,340
4 Claims. (Cl. 260—76)

This invention relates to hydroxynorcamphanecarboxylic acids and esters, to resinous polyesters thereof, and to the preparation of these materials.

The new class of monomeric compounds of the invention are represented by the following general formula:

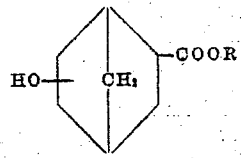

wherein R represents a hydrogen atom or alkyl group of from 1 to 12 carbon atoms, and more specifically alkyl esters of 5-hydroxynorcamphane-2-carboxylic acid and 6-hydroxynorcamphane-2-carboxylic acid. The free acids readily form salts with alkali metal hydroxides e.g. with sodium or potassium hydroxides. The above defined monomeric compounds self-condense at elevated temperatures to give resinous polyesters characterized by the recurring structural unit.

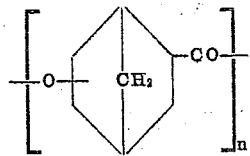

wherein $n$ represents a positive whole number signifying that the unit repeats itself to form a linear chain polymer. The above defined monomeric compounds also cocondense with each other in any proportions. They also readily co-condense with other materials capable of forming polyesters e.g. with mixtures of various dialkyl esters of dibasic acids and glycols, e.g. with alkyl esters of terephthalic acid and 1,4-cyclohexanedimethanol, the glycol being present in molecular amount slightly greater than the combined molecular amounts of the 5- (or 6)-hydroxynorcamphane-2-carboxylic acid ester and the dialkyl ester of the dibasic acid. Although any proportions of the above defined structural unit may be present in such copolyesters, advantageously there is present 5–45 mole percent of these units, the remainder of the polymer molecule being units formed with the other co-condensed materials. The polyesters and copolyesters of the invention are thermoplastic with melting points of 230–272° C., or even higher, forming clear viscous readily extrudable melts, and are particularly valuable for preparing fibers and films that are characterized by good elasticity, toughness, excellent tensile strength, good affinity for commercially available dyes, and excellent dielectric properties.

It is, accordingly, an object of the invention to provide novel monomeric 5-(or 6)-hydroxynorcamphane-2-carboxylic acid esters. Another object is to provide resinous polyesters and copolyesters that are readily dyeable and highly suitable for preparing fibers, sheets and molding compositions that are characterized by good strength and elasticity and excellent dielectric properties and having relatively high softening temperatures. Another object is to provide a process for preparing the new compounds. Other objects will become apparent hereinafter.

In accordance with the invention, we prepare the new monomeric 5-(or 6)-hydroxynorcamphane-2-carboxylic acid esters by heating bicyclo [2,2,1] hept-5-ene-2-carboxylic acid in acetic acid containing a small amount of water and sulfuric acid, extracting the reaction mixture with a dialkyl ether, for example, isopropyl ether, removing the solvent under reduced pressure to give the crude residual acetoxynorcamphane-2-carboxylic acid, and treating the acid with the desired alkanol containing from 1 to 12 carbon atoms e.g. methyl, ethyl, propyl, isopropyl, butyl, hexyl, decyl or lauryl, etc., alcohols, at reflux temperature, in the presence of an esterification catalyst such as hydrochloric acid, sulfuric acid, p-toluenesulfonic acid, etc. Advantageously, the esterification is carried out in an inert solvent medium such as toluene, xylene, etc., the water formed in the reaction being collected and eliminated in a Dean-Stark type of trap. The reaction mixture was then fractionally distilled to separate the solvent and products. In the above reactions, the acetic acid is employed in considerable excess i.e. about 4–10 molecular equivalents of the acid to each mole of the bicyclo [2,2,1] hept-5-ene-2-carboxylic acid. The alkanol employed for the esterification step is advantageously also used in excess i.e. about 3–10 molecular equivalents of the alcohol to each mole of the crude acetoxynorcamphane-2-carboxylic acid. The butyl ester prepared with n-butanol is preferred. The higher esters containing from 10–12 carbon atoms are valuable plasticizers for cellulose esters, and various vinyl polymers.

For preparing the homopolyesters and the copolyesters of the invention, we heat the hydroxynorcamphane-2-carboxylic acid ester or mixture of esters alone or with one or more of the other dibasic acid esters e.g. alkyl esters of succinic, adipic, sebacic, terphthalic acids, etc., for example, terephthalates represented by the general formula:

wherein each $R_1$ represents an alkyl group of 1 to 4 carbon atoms, such as the dimethyl, diethyl, dipropyl, dibutyl, etc., esters of terephthalic acid, and one or more glycols e.g. ethylene glycol, trimethylene glycol, hexamethylene glycol, 1,4-cyclohexanedimethanol, etc., in the presence of catalyst such as zinc chloride and titanium tetrabutoxide, at temperatures of 200–300° C., but preferably 220–290° C., in an inert atmosphere such as nitrogen, for a period of time sufficient to produce a high viscosity polyester (at least 0.40 intrinsic viscosity), in ordinarily from 1–5 hours of heating. Advantageously, the heating is carried out in the final stage under vacuum. The melts can be extruded to shaped articles directly as obtained or they can be allowed to solidify by cooling, followed by grinding to a fine powder and then heating further at temperatures insufficient to melt the powder, under vacuum, to remove the last traces of volatile materials. The powder may be stored and remelted as desired.

The following examples will serve to illustrate further our new compounds and the manner of preparing the same.

*Example 1*

A solution containing 158 g. (1.1 moles) of bicyclo [2,2,1] hept-5-ene-2-carboxylic acid, 360 cc. of acetic acid, 9 cc. of water and 3 cc. of of sulfuric acid was heated on a steam bath for 17 hours. About one-half of the acetic acid was distilled off under reduced pressure (base heater at 50° C.). The residue was taken up in isopropyl ether, washed with water four times, and dried with anhydrous sodium sulfate. The solvent was then removed under reduced pressure to give a crude product which was essentially 5-acetoxynorcamphane-2-carboxylic acid containing some of the isomeric 6-acetoxynorcamphane-2-carboxylic acid.

The above prepared crude product was dissolved in a mixture of 360 cc. of n-butanol, 150 cc. of toluene and 4 g. of p-toluenesulfonic acid, and refluxed. Water which formed was collected in a Dean-Stark trap filled with toluene. The total reaction time was 6 hours. The solution was cooled, washed with aqueous sodium bicarbonate solution, and dried with anhydrous sodium sulfate. After removal of the toluene and excess butanol by distillation, the residual liquid was fractionally distilled. The forerun contained an unidentified material which partially crystallized to a low-melting solid. The main fraction of 93 g. (40% yield) of a colorless liquid, B.P. 139° C./3 mm., $n_D^{20}$ 1.4766, was 5-hydroxynorcamphane-2-carboxylic acid butyl ester. Analysis of this product showed that it contained by weight 67.7% of carbon and 9.4% of hydrogen compared with calculated for $C_{12}H_{20}O_3$ of 68.0 and 9.4, respectively.

*Example 2*

A mixture containing 10 g. of the 5-hydroxynorcamphane-2-carboxylic acid butyl ester prepared by the process of Example 1, 0.005 g. of zinc acetate and 0.0028 g. of titanium tetrabutoxide was stirred at 220–230° C. in an atmosphere of nitrogen for one hour. A vacuum of 0.1 mm. was applied and stirring at 240° C. continued for 3 hours. The product had a high melt viscosity and a melting point of 230–240° C.

Fibers of this product were prepared by the melt-spinning process. They had a tensile strength of 4.7 g. per denier, an elongation of 21%, and dyed well with cellulose acetate dyes.

Films of this product were prepared by an extrusion process of the melt. They had excellent dielectric properties and were valuable as protective coatings under conditions of high humidity. For example, a film of the product with an inherent viscosity of 0.65 had, after exposure for 8 days at 110° C. and a relative humidity of 100%, an inherent viscosity of 0.60. Under the same testing conditions, the inherent viscosity of commercial polyethylene terephthalate film changed from 0.53 to 0.19.

In place of the said butyl ester, there may be substituted in the above example a like amount of the isomeric compound 6-hydroxynorcamphane-2-carboxylic acid butyl ester to give a similar polyester with generally similar properties. Also, there may be substituted in the example an equivalent amount of any other of the mentioned methyl, ethyl, propyl, butyl, etc. esters, for example, 5-hydroxynorcamphane-2-carboxylic acid methyl ester to give the corresponding polyester, or 5-hydroxynorcamphane-2-carboxylic acid hexyl ester to give the corresponding polyester, etc. All of these polyesters are characterized by being melt-spinnable to fibers and capable of being extruded to films that have generally similar properties as the polyester of the above example.

*Example 3*

This example illustrates a copolyester.

A mixture containing 8.5 g. (0.04 mole) of 5-hydroxynorcamphane-2-carboxylic acid butyl ester, 12 g. (0.06 mole) of dimethyl terephthalate, 18.7 g. (0.13 mole) of 1,4-cyclohexanedimethanol and 0.02 g. of titanium tetrabutoxide was stirred at 225° C. in an atmosphere of nitrogen for one hour. The temperature was then raised to 280° C. and a vacuum of 0.1 mm. applied for 10 minutes. On cooling a solid friable mass was obtained which was then ground to a powder to pass a 20-mesh screen and heated at 230° C. with 0.1 mm. of vacuum for 3 hours. The resulting powdered copolyester melted at 260–272° C. and had an intrinsic viscosity of 0.72. Strong elastic fibers could be pulled from the melt.

The proportions of components in the above example can be varied over a wide range, for example, excellent copolyesters are obtained with starting components in the molar ratios of from 1:9:10 to 9:1:2 of the hydroxynorcamphane-2-carboxylic acid butyl ester, dimethyl terephthalate and 1,4-cyclohexanedimethanol in that order. Thus, the butyl ester component may be present in the polymer molecule in as little as 5 mole percent and as much as 82 mole percent. Also, in place of the said butyl ester, there can be employed any other of the mentioned hydroxynorcamphane-2-carboxylic acid alkyl esters.

By following the procedures of the above examples for the preparation of the homopolyesters and the copolyesters, other resinous polyesters having generally similar properties making them especially useful for fibers and films can be prepared with any of the mentioned suitable components. If desired, modifying materials such as fillers, dyes, lubricants, plasticizers, and the like, may be incorporated into the polyester powders and melts of the invention. Also, the polyesters of the invention can be molded into stable, shaped articles by conventional molding methods. The film or sheet materials are useful also as photographic film supports.

What we claim is:

1. A linear fiber-forming polyester selected from the group consisting of (1) a homopolyester of a hydroxycamphanecarboxylic acid represented by the following general formula:

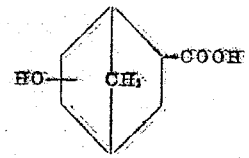

and (2) a copolyester of (a) said hydroxycamphanecarboxylic acid, (b) a dicarboxylic acid selected from the group consisting of an alkanedicarboxylic acid containing from 4–8 carbon atoms and terephthalic acid and (c) a glycol selected from the group consisting of an alkane glycol containing from 2–6 carbon atoms and 1,4-cyclohexane dimethanol in proportions of not less than 5 mole percent of each of said (a), (b) and (c) components and wherein the sum of said components (a), (b) and (c) equals 100 mole percent.

2. A linear fiber-forming homopolyester of a norcamphanecarboxylic acid represented by the following general formula:

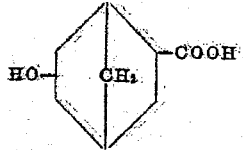

3. A process for preparing a linear fiber-forming polyester which comprises heating at 200–300° C. and in the presence of titanium tetrabutoxide as a catalyst, a monomeric material selected from the group consisting of (1) a hydroxycamphanecarboxylic acid ester represented by the following general formula:

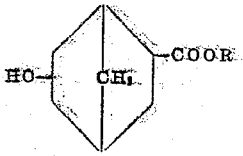

wherein R represents an alkyl group containing from 1–12 carbon atoms and (2) a mixture of (a) said hydroxynorcamphanecarboxylic acid ester, (b) a dicarboxylic acid selected from the group consisting of an alkanedicarboxylic acid containing from 4–8 carbon atoms and terephthalic acid and (c) a glycol selected from the group consisting of an alkane glycol containing from 2–6 carbon atoms and 1,4-cyclohexanedimethanol, said mixture containing not less than 5 mole percent of each of said (a), (b) and (c) components and wherein the sum of said components (a), (b) and (c) equals 100 mole percent.

4. A copolyester of (a) 5-hydroxycamphane-2-carboxylic acid, (b) terephthalic acid and (c) 1,4-cyclohexanedimethanol, in proportions of not less than 5 mole percent of each of said (a), (b) and (c) components and wherein the sum of said components (a), (b) and (c) equals 100 mole percent.

References Cited in the file of this patent

UNITED STATES PATENTS

| | | |
|---|---|---|
| 2,180,418 | James | Nov. 21, 1939 |
| 2,314,846 | McClellan | Mar. 23, 1943 |
| 2,360,866 | Gawey | Oct. 24, 1944 |
| 2,382,313 | Henke | Aug. 14, 1945 |
| 2,471,790 | Sowa | May 31, 1949 |
| 2,758,987 | Salzberg | Aug. 14, 1956 |
| 2,811,511 | Alderson | Oct. 29, 1957 |
| 2,894,976 | Banes | July 14, 1959 |

FOREIGN PATENTS

| | | |
|---|---|---|
| 1,001,259 | Germany | Jan. 24, 1957 |
| 862,273 | Netherlands | Sept. 16, 1957 |